United States Patent [19]

Price-Falcon et al.

[11] Patent Number: 4,793,856
[45] Date of Patent: Dec. 27, 1988

[54] PROCESS FOR THE DIRECT REDUCTION OF IRON ORES

[75] Inventors: J. Federico Price-Falcon; Hector Lopez-Ramos, both of Nuevo Leon, Mexico

[73] Assignee: Hylsa, S.A. de C.V., Guerrero y Munich, Mexico

[21] Appl. No.: 94,335

[22] Filed: Sep. 8, 1987

[51] Int. Cl.[4] .............................................. C21B 13/02
[52] U.S. Cl. ..................................................... 75/35
[58] Field of Search ...................... 75/34, 35, 90, 26; 266/195, 190, 191, 192

[56] References Cited

U.S. PATENT DOCUMENTS 4,205,831  6/1980  Vera et al. ........................... 266/195

FOREIGN PATENT DOCUMENTS 96232  6/1984  Japan ................................... 266/155

Primary Examiner—Melvyn J. Andrews
Attorney, Agent, or Firm—A. Thomas S. Safford

[57] ABSTRACT

A method for the gaseous reduction of particulate iron ore to sponge iron product in a vertical shaft reactor having a reduction zone in the upper portion thereof, a cooling zone in the lower portion thereof and an intermediate zone between the reduction and cooling zones. In order to reduce the tendency of the hot sponge iron to sinter and agglomerate, and stick to the walls of the reactor, and to give a more uniform product, a cool gas stream is introduced into the intermediate zone and caused to flow downwardly along the wall of the intermediate zone to cool the peripheral portion of the body of reduced ore flowing from the reduction zone through the intermediate zone.

11 Claims, 1 Drawing Sheet

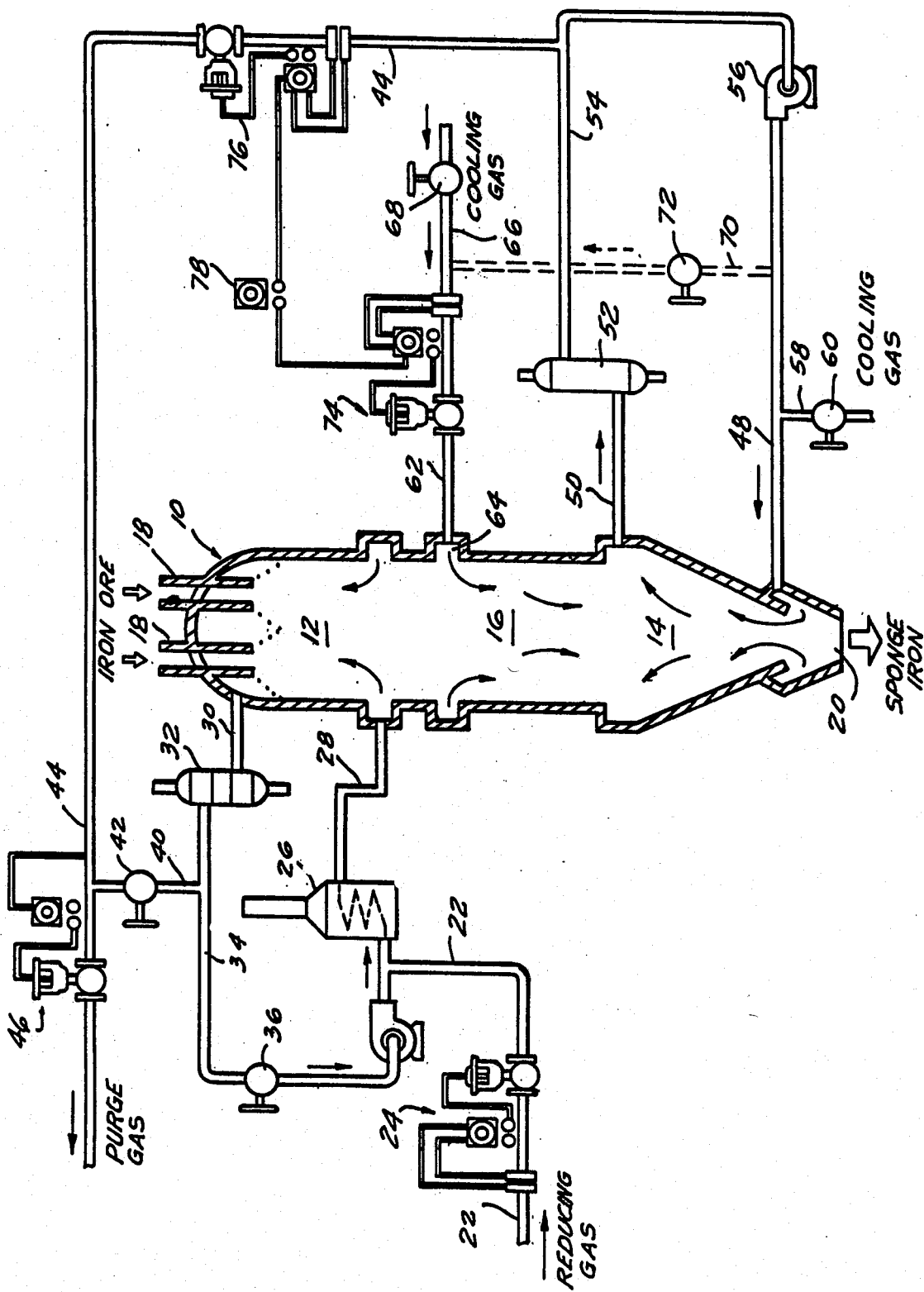

PROCESS FOR THE DIRECT REDUCTION OF IRON ORES

FIELD OF THE INVENTION

This invention relates to the gaseous reduction of iron ore in a vertical shaft, moving bed reactor to form sponge iron and more particularly to an improvement in the known gaseous reduction processes of this type that reduces the tendency of the hot reduced ore particles to sinter and agglomerate and thereby interefere with the smooth downward flow of the ore and sponge iron particles within the reactor.

BACKGROUND OF THE INVENTION

Typical gaseous reduction systems incorporating vertical shaft, moving bed iron ore reduction reactors are disclosed in U.S. Pat. Nos. 3,765,872; 3,770,421; 3,779,741; and 3,816,102. In such systems reduction of the ore has commonly been effected by a reducing gas largely composed of carbon monoxide and hydrogen. Such systems typically comprise a vertical shaft reactor having a reducing zone in the lower portion thereof and a cooling zone in the lower portion thereof. The ore to be reduced is fed to the top of the reactor and flows downwardly therethrough, first through the reducing zone wherein it is brought into contact with heated reducing gas from the reformer and then through the cooling zone wherein the reduced ore is cooled before being removed at the bottom of the reactor. Effluent gas from the reducing zone is cooled to remove water therefrom and in most cases a major part of the cooled effluent gas is reheated and recycled directly or indirectly to the reducing zone. Similarly, at least a part of the coolant gas withdrawn from the cooling zone is usually cooled and recycled to the cooling zone. At its lower end the reactor is provided with some means for controlling the discharge of the cooled sponge iron from the reactor, e.g. a rotary discharge valve, a vibratory chute, conveyor belt or the like.

One of the problems that is encountered in the operation of such moving bed reduction reactors arises out of the tendency of the freshly reduced hot sponge iron pellets to sinter and/or agglomerate into aggregates that obstruct both the smooth downward flow of solid particles through the reactor and the uniform distribution over the cross section of the reactor of the reducing gases flowing upwardly therein. In general, the rate at which the reduction reaction proceeds is a function of temperature. By increasing the reducing gas inlet temperature the rate of reduction can be increased, the residence time of the iron-bearing material within the reduction zone decreased and the productivity of the reactor thereby increased. On the other hand, an increase in the reducing gas temperature increases the tendency of the sponge iron particles to soften, become sticky and to agglomerate. This agglomerating tendency operates to limit the gas temperature that can be used. The particles at the reactor wall are subjected directly to the hottest portion of the reducing gas as it is injected through nozzles or other means through the walls of the reactor into the reducing zone. This results in the particles at the wall being hotter and more likely to become sticky relative to the rest of the descending particles, so that there is a tendency for the particles adjacent to the wall to adhere to the reactor's wall and cause additional obstruction.

The agglomeration problem has been aggravated in recent years by the practice of using relatively high grade iron ore in the form of pellets, rather than lumps of ore of widely varying sizes. Such pellets have greater physical strength and less tendency to disintegrate and pulverize than ores in lump form. Also, with their relatively high iron content produce a lesser amount of gangue when product sponge iron is used in the subsequent steel-making process. On the other hand, because of their higher iron content, such pellets show a greater tendency to agglomerate.

Various solutions to the agglomeration problem have been previously proposed. The simplest and most direct proposal is to put breaker mechanisms having any of various configurations inside the reactor and arranged so that they can be manipulated from outside the reactor to physically break-up the aggregates formed. See U.S. Pat. Nos. 4,449,671 (issued May 22, 1984) and 4,118,017 (issued Oct. 3, 1978). However, these are an added expense, and any such braker positioned within the reactor is itself an obstruction to the free flow of solid particles therethrough. It has been proposed that the ore to be charged to the reactor to be mixed with an inert material having lumps or particles of irregular shape, but the use of such an inert material makes necessary the additional step of separating the product sponge iron from the inert material. Accordingly, neither of these proposed solutions has been found economically satisfactory. An alternative method to reduce agglomeration has been to utilze natural gas addition to a closed cooling loop so that a small proportion of the methane-containing cooling gas flows upwardly to react endothermically with the water and carbon dioxide present in the reducing gas injected into the bottom of the reduction zone. By thus dropping the temperature of the sponge iron rapidly after leaving the reducing zone, the time available for forming agglomerations is lessened. See U.S. Pat. No. 4,556,417.

U.S. Pat. No. 4,002,422 discloses an apparatus for treating particulate iron ore with hot reducing gases in a reducing zone wherein a "cold process gas" is injected to the lower intermediate zone of the reactor. However, there is no teaching of agglomeration problems. Also, the injected gas is disclosed as flowing upwardly through said intermediate zone, being heated by the descending burden and contributing to the process in the same manner as the hot gas fed to the upper zone. If too much natural gas is injected to flow upwardly, this will tend to concentrate in the central core of the iron ore bed in the reducing zone.

U.S. Pat. No. 4,253,867, like U.S. Pat. No. 4,002,422, discloses the introduction of a separate gas stream into the intermediate zone of a reactor. In U.S. Pat. No. 4,253,867 the separate gas stream is a heated mixture of methane and steam and the gas stream flows upwardly rather than downwardly in the intermediate zone causing that core to be at a lower temperature and subjected to a lower quality reducing gas (due to the higher concentration of $CH_4$) than the rest of the bed. This results in a non-uniform product output.

U.S. Pat. No. 4,054,444 discloses a method for controlling carburization of metallic iron pellets by injecting cold natural gas to the intermediate zone or to the cooling zone. The objective of this natural gas is to increase the carbon content of iron pellets (not to prevent agglomeration). As shown in the patent drawings, the injected natural gas is intended to flow upwardly and to contribute to the reduction of the iron ore.

OBJECTS OF THE INVENTION

It is accordingly an object of the present invention to provide a process for the direct gaseous reduction of iron ore in a vertical shaft reactor which minimizes the agglomeration of the ore particles into aggregates.

It is another object of the invention to provide such a process wherein inlet reducing gas temperatures in excess of 900° C. may be used without serious agglomeration problems.

It is a further object to provide a process which lessens the tendency of the sponge iron to adhere to the walls of the reactor.

It is still another object of the invention to provide such a process wherein the residence time of the iron-bearing material in the reactor can be reduced, thereby increasing the productivity of the reactor.

Other objects of the invention will be in part obvious and in part pointed out hereafter.

BRIEF DESCRIPTION OF THE INVENTION

The process of the invention can be conveniently carried out in a vertical shaft reactor generally similar to the prior art reactors described above, having a reduction zone in the upper part of the reactor and a cooling zone in the lower part of the reactor. In accordance with the present invention, the iron-bearing material leaving the reduction zone passes through an intermediate zone before entering the cooling zone. The inlet reducing gas at an elevated temperature is conventionally introduced at the bottom of the reduction zone around the periphery of the reactor. Hence the hottest part of the material in the reactor, and that most subject to agglomeration, is the portion near the reactor wall at or near the level of the reducing gas inlet.

In accordance with the present invention a stream of cooling gas is introduced into the reactor near the top of the intermediate zone, is caused to flow downwardly along the wall of the reactor, and is removed near the top of the cooling zone, together with the stream of cooling gas that flows upwardly through the cooling zone. Thus, this secondary cooling stream, surprisingly, is introduced to the reactor only slightly below the introduction of hot reducing gas. The downwardly flowing secondary stream of cooling gas rapidly cools the material most likely to agglomerate and also cools the reactor wall, thereby preventing the iron-bearing material from sticking to the reactor wall.

The downflow cooling gas stream of the present invention may have the same composition as the principal cooling gas stream that flows through the cooling zone of the reactor or it may have a different composition. For example, it may be a reformable mixture of methane and steam which in contact with the hot descending sponge iron is partly or wholly reformed to a hydrogen/carbon monoxide mixture. The methane reforming reaction is endothermic and aids in the rapid cooling. Alternatively an inert gas, natural gas or other gases that have been previously proposed as coolants for this type of reactor may be used.

BRIEF DESCRIPTION OF THE DRAWINGS

In this specification and the accompanying drawings, Applicants have shown and described several preferred embodiments of their invention and have suggested various alternatives and modifications thereto, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

The accompanying drawing schematically illustrates a preferred embodiment of apparatus capable of carrying out the process of the invention.

DETAILED DESCRIPTION OF A PREFERRED EMBODIMENT OF THE INVENTION

Referring to the drawing, the numeral 10 generally designates a vertical shaft reactor having a reduction zone 12 in the upper portion thereof, a cooling zone 14 in the lower portion thereof and an intermediate zone 16 between the reaction and cooling zones. Ore pellets to be reduced are charged to the reduction zone 12 of the reactor through an inlet 18 and flow downwardly through the reactor in a moving bed wherein they are reduced to sponge iron by an upwardly flowing stream of hot reducing gas. The sponge iron pellets are cooled in cooling zone 14 and removed at the bottom of the reactor through a discharge connection 20. Preferably the reactor 10 is pressurized and uses a regulating valve and discharge mechanism similar to that disclosed in U.S. Pat. No. 3,710,808.

Referring to the left side of the drawing, reducing gas for reducing the ore pellets is supplied from a suitable source to a pipe 22 containing a flow controller 24. The reducing gas is desirably largely composed of carbon monoxide and hydrogen. It may be prepared, for example, by the catalytic reformation of a steam/methane mixture, reformation of coke oven gas, partial oxidation of a hydrocarbon or in other ways known in the art. The reducing gas is heated in heater 26 preferably to about 900° to 950° C. and then flows through pipe 28 to the bottom of the reduction zone 12.

The reducing gas flows upwardly through the downwardly moving ore bed in the reduction zone 12 and the spent gas leaves the reactor 10 through pipe 30. It is cooled and dewatered in a quench cooler 32 and then divided into two streams. One stream is recycled to the reactor; specifically it flows through pipe 34 containing valve 36 and compressor 38, is mixed with the incoming fresh gas entering through pipe 22, and after reheating in heater 26 is returned to the reactor through pipe 28. The second stream of spent gas is removed from the reducing gas loop through pipe 40 containing valve 42 and purge gas pipe 44 containing back pressure regulator 46. The purge gas is conducted to a suitable point of storage or use (not shown).

The cooling zone 14 forms part of a cooling gas loop which comprises a cooling gas supply pipe 48, a cooling gas exit pipe 50, a cooler 52, a cooled gas pipe 54 and a blower 56. Make-up cooling gas, which may, for example, be natural gas, reducing gas, or other gases known to be useful for this purpose, is supplied through pipe 58 containing valve 60. The cooled gas pipe 54 is interconnected with purge gas pipe 44 for reasons discussed hereafter.

In accordance with the present invention a second cooling gas stream is introduced into the reactor 10 near the top of the intermediate zone 16 through a pipe 62. More particularly, the second cooling stream is introduced into a plenum chamber 64 extending around the perimeter of the reactor and flows downwardly along the interior wall of zone 16, cooling the wall and the reduced pellets adjacent the wall. At the bottom of the intermediate zone the second cooling gas stream is mixed with the upwardly flowing primary or first cooling gas stream and the mixture is removed from the reactor through pipe 50. In this way agglomeration of the descending pellets in the region near the reactor wall and sticking of the pellets to the wall is minimized. As pointed out above, the reduced pellets are hottest at the point where they come in contact with the hot reducing gas supplied to the periphery of the bottom of the reduction zone and hence the feeding of a second cooling stream at the upper periphery of the intermediate zone is an especially effective way of minimizing agglomeration.

The second gas stream may be derived from a variety of sources. Thus, as indicated in the drawing, this second stream may be supplied from an independent outside source through pipe 66 containing valve 68. This could be the same source as supplies pipe 22. Alternatively, cooling gas from the main cooling loop may be transferred from pipe 48 near the discharge of compressor 56 through pipe 70 containing valve 72 to pipe 62.

It is important that the second cooling gas stream introduced into chamber 64 be caused to flow downwardly through the intermediate zone, since if this cool gas stream flowed upwardly into the reduction zone it would inhibit the desired reactions in that zone. To ensure such downward flow, a control system is preferably provided comprising a first constant flow controller 74 in pipe 62, a second constant flow controller 76 in purge gas pipe 44 and a ratio controller 78 interconnecting the two flow controllers for maintaining a predetermined flow ratio in pipes 62 and 44. By proper adjustment of the controllers 74, 76 and 78, downward flow of the second cooling gas stream can be maintained.

By appropriate controls, excess cooling gas from the cooling loop can be supplied at least partially to the reducing loop rather than to purge, particularly when this would result in increased energy efficiency. This might be desirable for example where the secondary cooling gas in pipe 62 is natural gas plus steam which is reformed as it descends through the intermediate zone to the cooling loop.

In some cases the controller 74 to 78 may not be necessary. It is often desirable to effect a carburization of the sponge iron in the cooling zone of the reactor by feeding a carburizing gas thereto, and to the extent that carburization occurs, carburizing gas is consumed and the volume of cooling gas is reduced. In such cases it may be possiblee to ensure downward flow of the second cooling stream without removing gas from the cooling loop through pipe 44.

From the foregoing description it should be apparent that the process of the present invention is capable of achieving the objectives and providing the advantages outlined above. By providing a second cooling gas stream that is introduced at the top of the intermediate zone and caused to flow downwardly along the reactor wall, the descending reduced ore particles near the wall are rapidly cooled and sticking of the particles to the wall and particle agglomeration are significantly reduced. Concomitantly, since the central core of the descending bed of particles is not directly subjected to the fresh reducing gas at its hottest, and since the reducing gas is flowing upwardly as well as inwardly, by the time it reaches the center of the bed that central core of particles may not be quite as reduced as the particles at the outer periphery of the bed. Thus, the cooling gas selectively flowing generally along the walls of the intermediate zone results in the generally unaffected core of particles having an opportunity for more complete reduction before being subjected to the full cooling effect from the cooling zone. This tends to give a more uniformly treated product.

It is, of course, to be understood that the foregoing description is intended to be illustrative only. Numerous changes within the scope of the invention will be apparent to those skilled in the art.

What is claimed is:

1. The method of reducing particulate ironore to sponge iron in a vertical shaft, moving bed reactor having a reducing zone in the upper portion thereof, a cooling zone in the lower portion thereof and an intermediate zone between said reducing and cooling zones, and wherein the ore is reduced by a stream of hot reducing gas that is caused to flow upwardly through a downwardly moving ore bed in said reduction zone and reduced ore is cooled by a first cooling gas stream that flows upwardly therethrough in said cooling zone, is removed from said reactor near the top of said cooling zone, then cooled and returned to the bottom of said cooling zone to form a cooling loop, and a make-up gas stream is supplied to said cooling gas loop, the improvement which comprises introducing a second cooling gas stream into said intermediate zone, causing said second cooling gas stream to flow downwardly and generally selectively along the wall of said intermediate zone where the wall is in contact with the reduced ore to cool said wall and the particulate reduced ore adjacent thereto, mixing said second cooling gas stream with said first cooling gas stream near the top of said cooling zone, and removing the resulting mixture from said reactor.

2. A method according to claim 1 wherein a purge gas stream is removed from said cooling loop and the ratio of the flow rate of said purge stream to the flow rate of said second stream is controlled to cause said second stream to flow downwardly in said intermediate zone.

3. A method according to claim 1 wherein the gas for said second stream is supplied from a source independent of said first cooling gas stream.

4. A method according to claim 1 wherein the gas for said second cooling gas stream is supplied by withdrawing gas from said cooling loop.

5. A method according to claim 4 wherein the gas withdrawn from said cooling loop is withdrawn between the discharge of said blower and the inlet of said cooling zone.

6. A method according to claim 1 wherein said second stream is a hydrocarbon.

7. A method according to claim 1 wherein said second stream is a reducing gas.

8. A method according to claim 1 wherein said second stream is natural gas.

9. A method according to claim 1 wherein said second stream is coke-oven gas.

10. A method according to claim 1 wherein said second stream is an inert gas.

11. A method according to claim 1 wherein said second gas stream is introduced to the intermediate zone near the top thereof.

* * * * *